(12) United States Patent
Bechtel et al.

(10) Patent No.: US 12,741,685 B2
(45) Date of Patent: Sep. 22, 2026

(54) MOTION CONTROL DEVICE FOR CONTROLLING A VEHICLE

(71) Applicant: FCA US LLC, Auburn Hills, MI (US)

(72) Inventors: Travis D Bechtel, Auburn Hills, MI (US); Zachary A Luetzen, Auburn Hills, MI (US); Brandon F Brady, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/950,619

(22) Filed: Nov. 18, 2024

(65) Prior Publication Data

US 2026/0138662 A1 May 21, 2026

(51) Int. Cl.

| | |
|---|---|
| ***B62D 1/04*** | (2006.01) |
| ***F16H 59/02*** | (2006.01) |
| ***G05G 1/04*** | (2006.01) |
| ***G05G 1/10*** | (2006.01) |
| ***G05G 5/03*** | (2008.04) |

(52) U.S. Cl.

CPC ................ *B62D 1/04* (2013.01); *G05G 1/04* (2013.01); *G05G 5/03* (2013.01); *F16H 2059/0247* (2013.01); *G05G 1/10* (2013.01)

(58) Field of Classification Search

CPC ... B62D 1/04; B62D 1/06; G05G 1/01; G05G 1/04; G05G 1/06; G05G 1/10; G05G 5/03; F16H 2059/0247; A63F 13/245

See application file for complete search history.

(56) References Cited

U.S. PATENT DOCUMENTS

| | | | | |
|---|---|---|---|---|
| 7,004,048 B2 * | 2/2006 | Kobayashi | B62D 1/166 | 74/552 |
| 7,278,510 B1 * | 10/2007 | Richards | F16H 59/02 | 74/473.31 |
| 7,392,724 B2 * | 7/2008 | Hartlaub | B62D 1/046 | 200/61.54 |

(Continued)

FOREIGN PATENT DOCUMENTS

| | | | | |
|---|---|---|---|---|
| CN | 106945711 A * | 7/2017 | | B62D 1/04 |
| CN | 106994998 A * | 8/2017 | | B62D 1/04 |

(Continued)

OTHER PUBLICATIONS

Fanatec Clubsport Formula V2.5 Wheel Review by Aero Veloce; https://www.youtube.com/watch?v=xeTIUFu570E; Published Sep. 4, 2023 (Year: 2023).*

(Continued)

*Primary Examiner* — Adam D Rogers

(74) *Attorney, Agent, or Firm* — Jeremy J. Klobucar

(57) ABSTRACT

A motion control device may have a main body having a right grip and a left grip fixed to the main body, wherein the right grip and the left grip are separated by the main body. The right grip and the left grip may be configured to be grasped by a hand and/or one or more fingers of a vehicle occupant to control the rotation of the motion control device about an axis. A right paddle and a left paddle mounted to the main body may be actuatable by one or more fingers of the vehicle occupant between a first position and a second position to control acceleration, friction braking, regenerative braking, or other vehicle functions.

20 Claims, 10 Drawing Sheets

(56) References Cited

U.S. PATENT DOCUMENTS

| | | | | |
|---|---|---|---|---|
| 7,976,385 | B2 * | 7/2011 | Riggs | A47C 15/004 463/36 |
| 8,079,615 | B2 * | 12/2011 | Tanaka | B62D 1/04 280/743.2 |
| 8,366,547 | B2 * | 2/2013 | Haswell | A63F 13/211 463/6 |
| 8,858,334 | B2 * | 10/2014 | Haswell | A63F 13/245 463/6 |
| 8,915,342 | B2 * | 12/2014 | Cook | B60K 20/06 74/473.31 |
| 9,002,597 | B2 * | 4/2015 | Sata | B60K 20/06 701/52 |
| 9,073,509 | B2 * | 7/2015 | Pohanka | B60R 21/21658 |
| 10,442,455 | B2 * | 10/2019 | McKinzie | B62D 1/181 |
| 10,731,749 | B2 * | 8/2020 | Jerger | F16H 59/0204 |
| D911,447 | S * | 2/2021 | Conrad | D21/333 |
| 11,279,230 | B2 * | 3/2022 | O'Rourke | B60K 23/04 |
| D954,840 | S * | 6/2022 | Jackermeier | D21/333 |
| D955,489 | S * | 6/2022 | Conrad | D21/333 |
| D981,494 | S * | 3/2023 | Jackermeier | D21/333 |
| D1,008,128 | S * | 12/2023 | Papis | D12/175 |
| D1,013,042 | S * | 1/2024 | Cubeddu | D21/333 |
| 11,897,537 | B2 * | 2/2024 | Yamamoto | B60K 26/04 |
| D1,016,690 | S * | 3/2024 | Vakili | D12/175 |
| 12,035,654 | B2 * | 7/2024 | Dai | A01D 34/6818 |
| D1,053,261 | S * | 12/2024 | Cubeddu | D21/333 |
| 12,157,411 | B1 * | 12/2024 | Zhou | B62D 1/046 |
| 12,319,141 | B2 * | 6/2025 | Morita | B60K 28/06 |
| 12,344,302 | B2 * | 7/2025 | Morita | B60T 7/102 |
| 2003/0045352 | A1 * | 3/2003 | Ireland | A63F 13/803 463/37 |
| 2023/0128403 | A1 * | 4/2023 | Kato | G05G 9/047 74/484 R |

FOREIGN PATENT DOCUMENTS

| | | | | |
|---|---|---|---|---|
| CN | 108791462 | A * | 11/2018 | B62D 1/04 |
| CN | 111409691 | A * | 7/2020 | B62D 1/04 |
| CN | 117469381 | A * | 1/2024 | F16H 59/0278 |
| CN | 118238895 | A * | 6/2024 | B62D 1/04 |
| DE | 102015114795 | A1 * | 7/2016 | B62D 1/06 |
| DE | 102020007158 | A1 * | 1/2021 | B60R 11/0235 |
| DE | 102019007715 | A1 * | 5/2021 | B62D 5/001 |
| DE | 102020000774 | A1 * | 8/2021 | B62D 1/06 |
| DE | 102020104158 | A1 * | 8/2021 | B60T 11/18 |
| DE | 102023001993 | B3 * | 7/2024 | B60Q 1/42 |
| EP | 1155939 | A2 * | 11/2001 | B62D 1/04 |
| EP | 1211119 | A2 * | 6/2002 | B62D 1/046 |
| EP | 1403120 | A1 * | 3/2004 | B60K 20/06 |
| FR | 2792085 | A1 * | 10/2000 | F16H 59/08 |
| GB | 2615999 | A * | 8/2023 | B66F 9/0655 |
| JP | 2005225384 | A * | 8/2005 | B62D 1/02 |
| JP | 2006007949 | A * | 1/2006 | |
| KR | 19980018193 | U * | 7/1998 | B62D 1/04 |
| KR | 200142739 | Y1 * | 6/1999 | B62D 1/04 |
| KR | 200161227 | Y1 * | 11/1999 | B62D 1/04 |
| KR | 20060019763 | A * | 3/2006 | B62D 15/0205 |
| KR | 102024649 | B1 * | 9/2019 | B60R 21/2037 |
| KR | 102024650 | B1 * | 9/2019 | B60R 11/0235 |
| WO | WO-2020016630 | A1 * | 1/2020 | B62D 1/183 |

OTHER PUBLICATIONS

Machine translation of DE 102015114795 A1 obtained on Oct. 9, 2025.*

Machine translation of FR 2792085 A1 obtained on Oct. 9, 2025.*

Machine translation of KR 20060019763 A obtained on Oct. 9, 2025.*

Machine translation of DE 102019007715 A1 obtained on Oct. 14, 2025.*

Machine translation of JP 2006-007949 A obtained on Jan. 12, 2006.*

Steering Wheel of Lamborghini Huracan Super Trofeo Evo2; https://www.lamborghini.com/en-en/motorsport/motorsport-models/hurac%C3%A1n-super-trofeo-evo2.*

Steering Wheel for Lamborghini Huracan GT3 Evo2; https://www.lamborghini.com/en-en/motorsport/motorsport-models/huracan-gt3-evo2.*

Fanatec; Clubsport Steeing Wheel Formula V2.5X; https://fanatec.com/us-en/steering-wheels/clubsport-steering-wheel-formula-v2.5x (11 pages).

Stocksdale, Joel; Toyota Neo Steer Prototype First Drive Review: Feet-Free Motoring Is Pretty Groovy; Nov. 3, 2023 (5 pages).

* cited by examiner 10
14
24
116L
70L
72L
54L
50L
22
50
54
74
70
74L
72
116
46L
46
36L
62L
62
36
58L
16
58
34
64L
64
32
56L
56
52
52L
209
211
21
68L
208
210
208
68
44L
78
76
44
20
82
66L
66
80
60L
60
206
28
26
204
216
48L
212
214
48
202
200

54
70
72
74
16
50
80
46
14
22
116
36
10
50L
90
72L
58
64
32
54L
56
70L
46L
74L
60
98L
58L
44
116L
82
64L
56L
90L
48
100L
36L
66
88L
34
66
44L
48L

MOTION CONTROL DEVICE FOR CONTROLLING A VEHICLE

FIELD

The present disclosure relates to a motion control device for controlling a vehicle.

BACKGROUND

Traditionally, vehicles have used one or more foot operated pedals mounted near or on a floor of a vehicle. The foot pedals actuatable by one or more feet of a vehicle occupant to control the speed of the vehicle. A round wheel is mounted to a steering rack to mechanically adjust the lateral trajectory of the vehicle. Fixed steering ratios require hand-over-hand motions to steer the vehicle. Removal of one or more hands from the steering control prevents placing controls to key vehicle functions on the steering wheel, as removal of a hand may prevent the vehicle occupant from braking or steering, possibly resulting in a collision. Furthermore, humans are generally more coordinated and precise using their hands than their feet, making foot operated controls sub-optimal for driving a vehicle.

SUMMARY

In at least some implementations, a motion control device for controlling a vehicle includes a main body, a right grip connected to the main body by a first right bridge and a second right bridge, a left grip connected to the main body by a first left bridge and a second left bridge, the right grip and the left grip are each spaced from the main body, and the right grip and the left grip are configured to be grasped by a hand and/or one or more fingers of a vehicle occupant. A right paddle may be pivotably mounted to the main body and located behind the right grip, and a left paddle may be pivotably mounted to the main body and located behind the left grip, the right paddle and the left paddle are movable relative to the main body between a first position and a second position. A first right gap is defined between the main body, the right grip, the first right bridge and the second right bridge, wherein the first right gap, the right grip, and the right paddle are configured to simultaneously receive one or more fingers, or surfaces of a hand of the vehicle occupant. A first left gap is defined between the main body, the left grip, the first left bridge, and the second left bridge, wherein the first left gap, the left grip, and the left paddle are configured to simultaneously receive one or more fingers, or surfaces of a hand of the vehicle occupant. A second right gap defined between the main body, the right grip, and the second right bridge, wherein the second right gap, the right grip, and the right paddle are configured to simultaneously receive one or more fingers or surfaces of a hand of the vehicle occupant. A second left gap may be partially defined between the main body, the left grip, and the second left bridge, wherein the second left gap, the left grip, and the left paddle are configured to simultaneously receive one or more fingers or surfaces of a hand of the vehicle occupant.

In at least some implementations, the right grip extends beyond a top surface of the main body and has a knob with an upper surface and one or more peripheral side surfaces. The upper surface, the one or more peripheral side surfaces, the right grip, and the right paddle are configured to simultaneously contact one or more fingers or surfaces of a hand of the vehicle occupant.

In at least some implementations, the left grip extends beyond a top surface of the main body and has a knob with an upper surface and one or more peripheral side surfaces and the upper surface, the one or more peripheral side surfaces, the left grip, and the left paddle are configured to simultaneously contact one or more fingers or surfaces of a hand of the vehicle occupant.

In at least some implementations, the right paddle has a front side and a back side wherein, the back side has a right inner grip surface at a different angle or elevation relative to the back surface.

In at least some implementations, the left paddle has a front side and a back side wherein, the back side has a left inner grip surface at a different angle or elevation relative to the back surface.

In at least some implementations, the left paddle is coupled to the main body by a left mount and the right paddle is connected to the main body by a right mount, and the left paddle extends from the mount towards the left grip, and the right paddle extends from the mount towards the right grip.

In at least some implementations, the right paddle and the left paddle are mechanically biased towards the first position.

In at least some implementations, the right paddle is farther from the right grip in the first position than in the second position.

In at least some implementations, actuation of the left paddle causes a different output than actuation of the right paddle.

In at least some implementations, the left paddle includes a left outer grip surface that is elevated from a back side of the left paddle that faces away from the left grip, and the right paddle includes a right outer grip surface that is elevated from a back side of the right paddle that faces away from the right grip.

In at least some implementations, the main body has a top surface and a bottom surface spaced apart in a vertical direction, a left side and a right side spaced apart in a lateral direction and front surface and a back surface spaced apart in a longitudinal direction, and wherein the right grip is spaced from the right paddle in the longitudinal direction, and the right grip longitudinally and laterally overlaps the right paddle.

In at least some implementations, the first right bridge is connected to the right grip at or adjacent to an upper end of the right grip, the second right bridge is connected to the right grip between the upper end and a lower end of the right grip, and the lower end of the right grip is free and is spaced from the main body.

In at least some implementations, a vehicle includes a propulsion system having a prime mover that provides power to propel the vehicle, a braking system having one or more brake assemblies configured to slow and stop the vehicle, a steering system configured to control a steering angle of the vehicle; and a motion control device. The motion control device includes a main body that has a front surface, a back surface, a top surface, a bottom surface, a right side, and a left side, the main body about an axis to actuate the steering system and change the steering angle. The main body includes a right paddle mounted to the back surface by a right mount, wherein the right paddle is actuatable between a first position and a second position to cause an output used to control one of the braking system or the propulsion system, a right paddle sensor capable of determining the instantaneous position of the right paddle between the first position and the second position, a right grip extended from the right side wherein the right grip is received in front of the right paddle, a knob extending from the right grip and elevated from the top surface, a left paddle mounted to the back surface by a left mount, wherein the left paddle is actuatable between a first position and a second position to cause an output used to control the other one of the braking system or the propulsion system that is not associated with the right paddle, a left paddle sensor capable of determining the instantaneous position of the left paddle between the first position and the second position, a left grip extended from the left side wherein the left grip is received in front of the left paddle, a knob extending from the left grip and elevated from the top surface, a first right gap circumferentially surrounded by the main body, the right grip, and a first right bridge that connects the main body and the right grip, a second right gap partially circumferentially surrounded by the main body, the right grip, and a second right bridge, a first left gap circumferentially surrounded by the main body, the left grip, and a first left bridge that connects the main body and the left grip, a second left gap partially circumferentially surrounded by the main body, the left grip, and a second left bridge.

In at least some implementations, the right paddle and the left paddle are mechanically biased towards the first position.

In at least some implementations, one or more electric motors are positioned on or within the main body or the mount and arranged to provide a force on either or both of the right paddle and left paddle.

In at least some implementations, the main body has a range of rotation about the axis, the range of rotation is adjustable based on one or more vehicle conditions such as instantaneous speed of the vehicle, historical speed of the vehicle, instantaneous vehicle turning radius, historical vehicle turning radius, instantaneous rate of rotation of the main body, and historical rate of rotation of the main body.

In at least some implementations, a control system is coupled to the propulsion system, the brake system, the steering system and the motion control device, the control system includes one or more processors, memory and instruction by which the control system controls operation of the propulsion system as a function of movement of one of the right paddle or the left paddle, and controls operation of the braking system as a function of movement of the other one of the right paddle or the left paddle, and controls the steering system as a function of the rotation of the main body.

In at least some implementations, the steering system is a steer by wire system in which rotation of the main body results in the control system actuating one or more steering actuators, such as electric motors, to change the steering angle, and wherein rotation of less than 180 degrees about the axis causes the steering system to provide a maximum steering angle of the vehicle.

In at least some implementations, the main body, the top surface, and the bottom surface are spaced apart in a vertical direction, the left side and the right side are spaced apart in a lateral direction, and the front surface and the back surface are spaced apart in a longitudinal direction, and wherein the right grip is spaced from the right paddle in the longitudinal direction, and the right grip longitudinally and laterally overlaps the right paddle.

In at least some implementations, the first right bridge is connected to the right grip at or adjacent to an upper end of the right grip, the second right bridge is connected to the right grip between the upper end and a lower end of the right grip, and the lower end of the right grip is free and is spaced from the main body.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figures 1, 2:
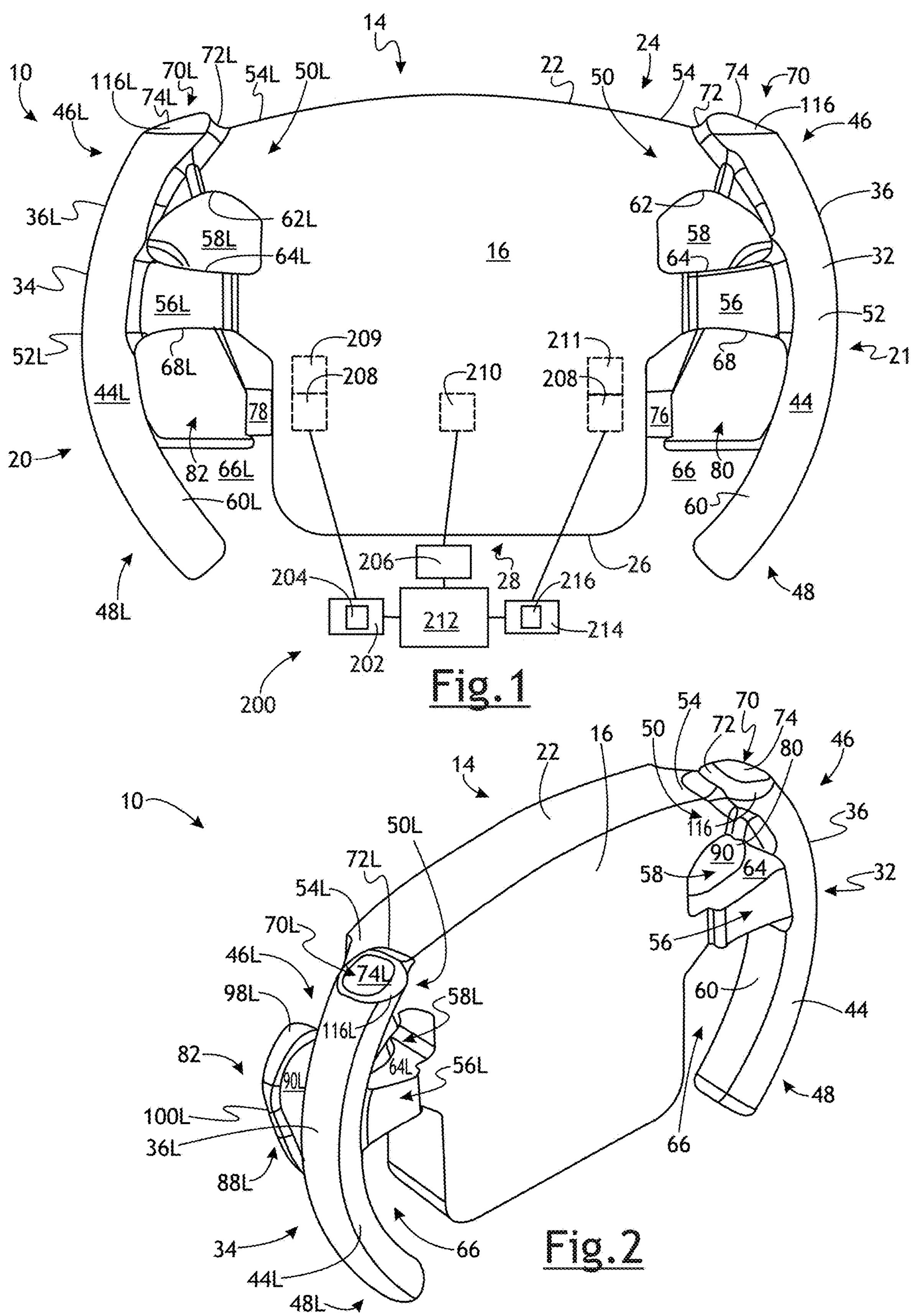
FIG. 1 shows a front view of a motion control device.
FIG. 2 shows a perspective view of the front of the motion control device.

Referring in more detail to the drawings, FIGS. 1-20 illustrate a motion control device 10 for controlling a vehicle 200 with a propulsion system 202 including a prime mover 204 coupled to multiple wheels to propel the vehicle 200. The prime mover 204 could be an electric motor, a combustion engine, or both, as desired. Further, with electric motors, one or more motors may be used to power individual axles/shafts or wheels, as desired. To slow and stop the vehicle 200, the vehicle 200 includes a primary braking system 214. The primary braking system 214 includes multiple brake assemblies 216, each associated with a different one and up to each wheel of the vehicle 200 includes a brake assembly 216. The brake assemblies 216 may be friction brakes and/or a regenerative braking system of known types. To control the direction of vehicle travel, the vehicle 200 includes a steering system 206 which may include mechanically coupled steering components, or a steer-by-wire system including one or more steering actuators, such as electric motors, that drive suitable steering components.

The motion control device 10 is mounted within an interior of the vehicle 200 for rotation about an axis 12. Rotation of the motion control device 10 causes a change in the steering angle and direction of travel of the vehicle 200. The motion control device 10 has a main body 14 that may be mounted to a steering shaft, and that may be adjusted telescopically along the axis 12, and the steering shaft and/or motion control device 10 may be moved up, down, right, left, or a combination of directions relative to the interior of the vehicle 200 to provide the motion control device 10 at a desired location and orientation within the interior. The main body 14 has a front surface 16 that faces toward a vehicle occupant, a back surface 18 that faces away from a vehicle occupant, opposite left and right sides 20, 21, a top surface 22 that connects the front and back surfaces 16, 18 at an upper side 24 of the main body 14, and a bottom surface 26 that connects the front and back surfaces 16, 18 at a lower side 28 of the main body 14. The main body 14 has a longitudinal thickness, generally in the direction of the axis 12, between the front and back surfaces 16, 18, a lateral width between the left and right sides 20, 21, and a vertical height between the top and bottom surfaces 22, 26. As used herein, the terms longitudinal, lateral, and vertical refer to the corresponding, mutually perpendicular directions or axes (e.g. X, Y and Z axes) as noted.

To facilitate user interaction and use thereof, the motion control device 10 has two grips, each arranged to be held or otherwise engaged by a hand 30 of a driver. A right grip 32 extends outwardly from and is connected to the right side 21 of the main body 14, and a left grip 34 is connected to a left side 20 of the main body 14. The right and left grips 32, 34 may be mirror images of each other, in at least some implementations.

The right grip 32 may be generally cylindrical in shape, may have an irregular or oblong cross section (e.g. not circular), and may be of a size to be grasped by or received in a driver's hand 30, with an outer surface 36 in a palm of the driver's hand 30, and with the fingers 38 of the hand 30 wrapping or received about or behind a rear surface 40 of the grip 32, and part of the thumb 42 adjacent to or engaged with a front surface 44 of the grip 32. The right grip 32 may be curved circumferentially about the axis 12 such that a center of mass of the grip 32 at a midpoint 52 between an upper end 46 and a lower end 48 of the right grip 32 is not along a straight line that intersects the center of mass at the upper and lower ends 46, 48. In the example shown, the line is received between the axis 12 and the center of mass of the midpoint 52. The right grip 32 may have a longitudinal thickness that is less than that of the main body, in at least some implementations, and the rear surface 40 of the grip 32 may be offset forwardly from the back surface 18 of the main body 14.

Figures 3, 4:
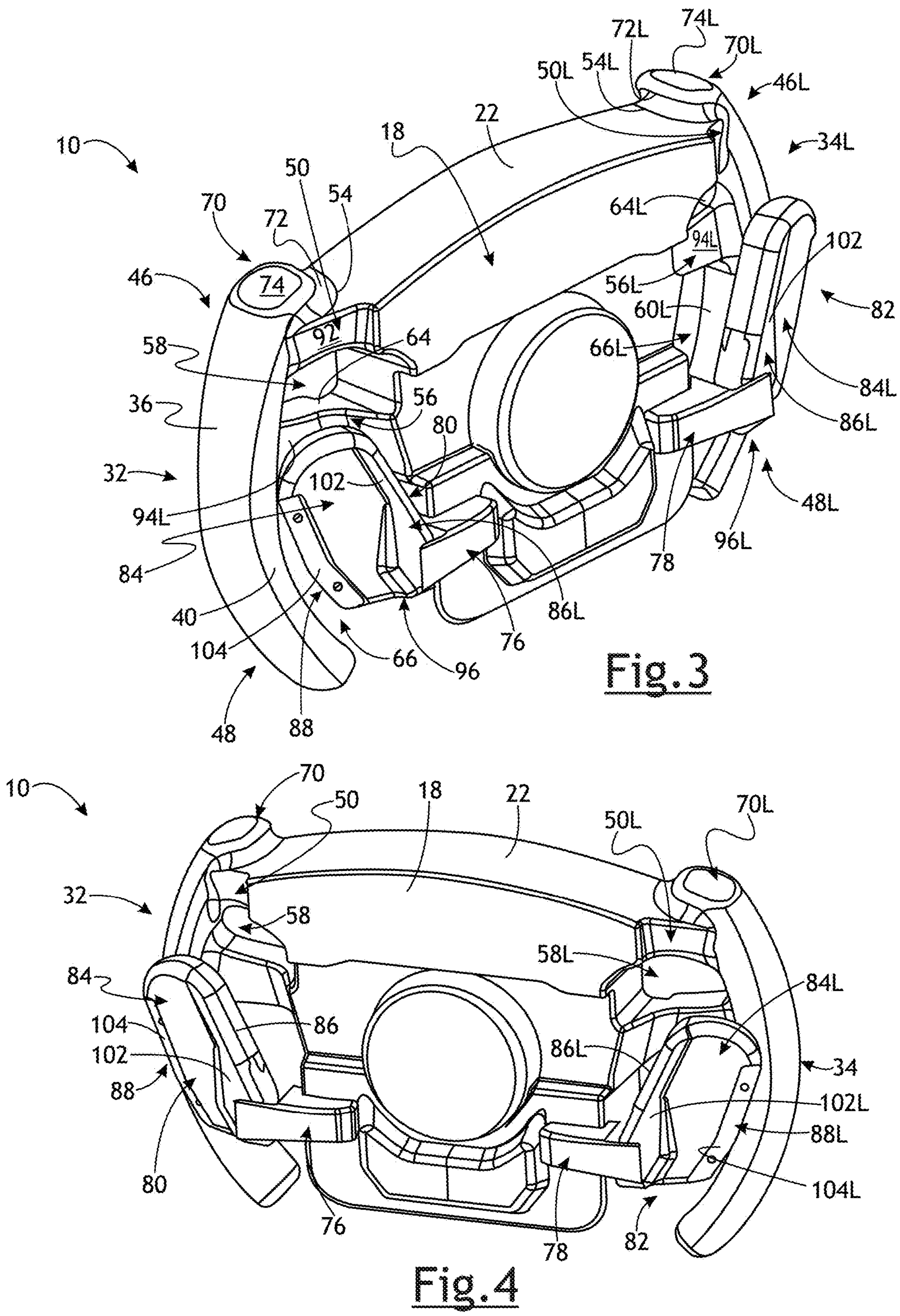
FIG. 3 shows a perspective view of the motion control device.
FIG. 4 shows another perspective view of the motion control device.

In at least some implementations, the right grip 32 is connected to the main body 14 in two spaced apart locations along the right side 21, by two connecting pieces or bridges. A first or upper bridge 50 connects the right grip 32 to the main body 14 at a location between the midpoint 52 and the upper end 46. An upper surface 54 of the first bridge 50 may be contiguous and flush with the top surface 22 of the main body 14, or otherwise arranged as desired. A second or lower bridge 56 connects the right grip 32 at a location closer to the bottom surface 26 of the main body 14 than the first bridge 50, and is separated from the first bridge 50 by a first right gap 58. As shown in FIGS. 2-4, the longitudinal thickness of one or both bridges 50, 56 may be varied along the lateral length thereof, and at least part of the second bright 56 may have a thickness that is less than that of the main body. This enables, as shown in FIG. 4, the paddles to be moved closer to the grip 32 without interference from the second bridge 56.

The first right gap 58 may be an opening that extends through the motion control device 10 and is defined by part of the right side 21 of the main body 14, part of an inside surface 60 of the right grip 32, a lower surface 62 of the first bridge 50 and an upper surface 64 of the second bridge 56. A second right gap 66 may be an opening that extends through the motion control device 10 and is defined by part of the right side 21 of the main body 14, part of the inside surface 60 of the right grip 32, and a lower surface 68 of the second bridge 56. The second gap 66 may extend to the bottom surface 26 of the main body 14 and the bottom surface 26 of the right grip 32. That is, the right grip 32 may be separate from and not coupled to the main body 14 below the second bridge 56, in at least some implementations. In this way, the lower end 48 of the grip 32 is free and not directly coupled to the main body 14 (e.g. the portion of the right grip 32 below the second bridge 56 is cantilevered).

To provide an additional manipulation, control or rest feature, the motion control device 10 may include a right knob 70 that extends from one or both of the right grip 32 and the upper surface 54 of the first bridge 50 and/or the top surface 22 of the main body 14. In at least some implementations, the knob 70 extends above the upper surface 54 of the first bridge 50 and the top surface 22 of the main body 14, and is aligned with and may define at least part of the upper end 46 of the right grip 23. The knob 70 has a peripheral side surface 72 that extends vertically to an upper surface 74 of the knob 70. The peripheral side surface 72 may have chamfered or rounded edges or transition surfaces that ergonomically merge with the right grip 32 and with the upper surface 54 of the first bridge 50 and/or the top surface 22 of the main body 14. In at least some implementations, a front surface of the knob 70 may be offset and forward of the front surface 16 of the main body 14, and the front surface 44 of the right grip 32 (and also that of the left grip) may similarly be offset forward of the front surface of the main body.

As noted, the left grip 34 is, in at least some implementations, a mirror image of the right grip 32. As such, the construction and arrangement of the left grip 34 will not be separately described with the same level of detail as the right grip 32. The same reference numerals used to identify in the drawings features of the right grip 32, including the bridges 50, 56 and the right knob 70, will be used to refer to corresponding features of the left grip 34, with a letter "L" added to each.

As shown in FIGS. 1-4, a right mount 76 and a left mount 78 may be fixed to or integrated with (i.e. formed in the same piece of material as part or all of) the main body 14 to pivotably mount a right paddle 80 and a left paddle 82 to the back surface 18 main body 14. The right paddle 80 is mounted to the right mount 76 and the left paddle 82 is mounted to the left mount 78. The paddles 80, 82 may be connected to the mounts 76, 78 at a back side 84 of the paddles 80, 82 and near an inner side 86 of the paddles 80, 82 such that the paddles 80, 82 extend outwardly from the sides 20, 21 of the main body 14 and toward or to the grips 32, 34. The paddles 80, 82 are cantilevered to the mounts 76, 78 so that the outer sides 88 of the paddles 80, 82 are free and are located farther from the axis 12 than are the inner sides 86, and with front sides 90 of the paddles 80, 82 longitudinally spaced from the rear surfaces 92, 94 of the bridges 62, 64 and the rear surfaces 40 of the grips 32, 34. In at least some implementations, the paddles 80, 82 are coupled to their respective mount 76, 78 near to a lower edge 96 of the paddles 80, 82 than the upper edge 98. Further, the upper edge 98 of each paddle 80, 82 may be vertically aligned with part of the first gaps 58, 58L at each side 20, 21 of the main body 14. That is, the upper edges 96, 96L may be below the lower surface 68, 68L of the first bridge 50, 50L and above the upper surface 64, 64L of the second bridge 56 in at least some positions of the paddles 80, 82. The outer edge 100, 100L of each paddle 80, 82 may be laterally inboard of the outer surface 36, 36L of the grips 32, 34. And the lower edge 96 of each paddle 80, 82 may be located vertically above the lower end 48, 48L of the grips 32, 34 and accessible from the second gaps 66, 66L.

The right paddle 80 and the left paddle 82 may each have an inner grip surface 102 and an outer grip surface 104, along part of the back side 84 of the paddles 80, 82. The inner grip surface 102 of each paddle 80, 82 may be recessed from the back sides 84 of the paddles 80, 82, may be located at the inner sides 86 of the paddles 80, 82, and may span vertically along a portion of the paddles 80, 82. A chamfer or transition surface 106 may connect or merge the inner grip surfaces 60, 60L to the back sides 84 of the paddles 80, 82. The outer grip surfaces 104 may be elevated or raised from the back sides 84 of the paddles 80, 82 and span vertically and inward partly toward the inner grip surface 102, along a portion of the back sides 84 of the paddles 80, 82. For example, the outer grip surface 104 may be located on the outer or right side 88 of the right paddle 80 and the outer or left side 88 of the left paddle 82.

Each paddle 80, 82 is separately and independently actuatable between a first position 108 (FIG. 5) and a second position 110 (FIG. 6) in which the paddles 80, 82 are pivoted or otherwise moved towards the back surface 18 of the main body 14 and right grip 32 and are closer to the main body 14 and right grip 32 than in the first position 108. By separately and independently actuated it is meant that the paddles 80, 82 can move independently of each other such that movement of one paddle does not cause movement of the other paddle. In this way, the paddles 80, 82 may be used to cause different outputs.

One or more right paddle sensors 208 may be integrated with the right mount 76 or otherwise carried by the main body 14, and one or more left paddle sensors 208 may be similarly arranged relative to the left paddle 82 to detect the movement and instantaneous position of the paddles 80, 82 as they travel to and between their first positions 108 and second positions 110.

A right actuator 209 (FIG. 1) and a left actuator 211 (FIG. 1) may be integrated with the right paddle 80 and left paddle 82. The right and left actuators may be configured to provide force feedback to the paddles 80, 82 and/or to provide some resistance to movement of the paddles 80, 82. These actuators 209, 211 may be electric actuators or hydraulic actuators and may provide variable levels of resistance, vibration, and motion configurable by a control system 212. The paddles 80, 82 may be mechanically or electro-mechanically biased towards the first position 108 by a spring, the actuators or by other means.

The control system 212 may include a controller in communication with the prime mover 204, the battery, the paddle sensors 208, the actuators, and a rotation sensor 210 for determining the angle of rotation of the motion control device 10 about the axis 12. The control system 212 has one or more controllers or processors, memory and instructions or programs stored in the memory or otherwise accessible by the processor(s). In some implementations, the control system 212 may have or be defined by a plurality of vehicle controllers independent or networked to each other. Each of the controllers may communicate with one or more vehicle components, or system components.

In order to perform the functions and desired processing set forth herein, as well as the computations therefore, the control system 212 may include, but is not limited to, one or more controller(s), control unit(s), processor(s), computer(s), DSP(s), memory, storage, register(s), timing, interrupt(s), communication interface(s), and input/output signal interfaces, and the like, as well as combinations of the foregoing. For example, the control system 212 may include input signal processing and filtering to enable accurate sampling and conversion or acquisitions of such signals from interfaces and sensors. As used herein the terms control system 212 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 212 may be distributed among different vehicle modules, such as an infotainment system control module, engine control module or unit, powertrain control module, transmission control module, and the like, if desired, and the memory and one or more processors may be one or both integrated into the vehicle or remotely located and wirelessly communicated to the vehicle 200, as desired.

The term "memory" or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

Traditionally, vehicles have used foot operated pedals mounted near or on a floor of a vehicle actuatable by one or more feet of a vehicle occupant to control the speed of the vehicle 200 (e.g. acceleration and braking) and a steering wheel mounted to a steering rack to control vehicle steering. With a mechanically coupled steering wheel, turns of 90-degrees or more require a hand-over-hand maneuver where one hand is removed from and repositioned on the wheel to enable the required rotation of the steering wheel. This is due to fixed steering ratios of the mechanically linked steering system components.

By implementing the motion control device 10 with a steer by wire system, hand-over-hand steering motions may be eliminated to permit constant contact of the driver's hands 30 with the motion control device 10, e.g., the grips 32, 34 and paddles 80, 82 of the motion control device 10. For example, the steer by wire system may have variable steering ratios, possibly to provide maximum steering angle in 180 degrees of motion or less, adjusted by the control system 212 based on vehicle speed, acceleration, or other conditions to enable a complete vehicle turn (e.g. a turn having the minimum radius the vehicle 200 can traverse) without requiring the driver to remove a hand 30 from the motion control device 10. The range of rotation of the motion control device 10 may be adjustable based on one or more vehicle conditions such as instantaneous speed of the vehicle, historical speed of the vehicle, instantaneous vehicle turning radius, historical vehicle turning radius, instantaneous rate of rotation of the main body 10, and historical rate of rotation of the main body 10.

With constant contact by a driver's hands 30 with the right and left paddles 80, 82, the paddles 80, 82 may be assigned to control the acceleration and braking functions of the vehicle, traditionally reserved for foot pedals. In drive by wire and brake by wire systems, the paddles 80, 82 are coupled to the control system 212 which is coupled to the propulsion and braking systems 202, 214 to enable desired control of the vehicle acceleration and braking functions, and allowing the foot pedals to be eliminated or reassigned to other functions.

In at least some implementations, one of the paddles 80, 82 may be assigned to control the acceleration of the vehicle. So that when the paddle 80, 82 is actuated from the first position 108 towards the second position 110 by a hand 30 or fingers 38 of the driver, the paddle sensor 208 may communicate to the control system 212 the position of the paddle 80, 82 so that the control system 212 can actuate the prime mover to accelerate the vehicle. Upon releasing the paddle 80, 82, if assigned to control acceleration of the vehicle, the acceleration may decrease or the vehicle may begin braking as the paddle 80, 82 returns toward or to the first position 108. When the paddle actuator is moved towards the second position 110 at a rate that would result in more power than what can be effectively transferred to the road based on the current friction available between the wheels and the road, a loss of traction may be detected by the control system 212 or be projected to occur by the control system 212.

To maintain vehicle stability, the control system 212 may override the user input, reducing the power provided to the prime mover. In this scenario, the actuator may be controlled by the control system 212 to provide force feedback to the vehicle occupant based on this reduction of power. For example, the actuator may vibrate, add resistance to, or change the position of the paddle 80, 82 towards the first position 108 to communicate to the vehicle occupant the reduction of power by the control system 212 due to loss of traction of the wheels.

In some embodiments, the friction braking system, regenerative braking system, or both may be controlled by the right or left paddles 80, 82. So that when the paddle 80, 82 is actuated from the first position 108 towards the second position 110 by a hand 30 or fingers 38 of the driver, the associated paddle sensor 208 may communicate to the control system 212 the position of the paddle 80, 82 to actuate the friction brakes and/or the regenerative braking system. Upon releasing the paddle 80, 82, if assigned to control the braking system(s) 214 of the vehicle, the vehicle may reduce braking power as the paddle 80, 82 returns toward or to the first position 108. When the paddle 80, 82 is moved towards the second position 110 an amount or at a rate that could result in more stopping power than what can be effectively transferred to the road based on the current friction available between the wheels and the road, a loss of traction may be detected by the control system or may be projected to occur by the control system. To maintain control of the vehicle, the controls system may override the user input, reducing the braking force applied to the wheels, and or the braking can be controlled by an anti-lock braking system and/or electronic stability control system.

In this scenario, the actuator may be controlled by the control system 212 to provide force feedback to the vehicle occupant based on this reduction of braking force. For example, the actuator may vibrate, add resistance to, or change the position of the paddle 80, 82 towards the first position 108 to communicate to the vehicle occupant the reduction of braking force by the control system 212 due to loss of traction of the wheels. The force feedback provided by the actuator to the paddle 80, 82 may pulsate to simulate the pulsation of braking force applied to a wheel of a vehicle when anti-lock brake systems are used to maintain control of the vehicle.

As shown in FIGS. 7-20, the motion control device 10 may be configured to accommodate different hand positions, permitting constant, precise control of the right and left paddles 80, 82, and control of the rotation of the motion control device 10 to steer the vehicle, while reducing fatigue and discomfort to the driver. In these drawings, the driver's right hand 30 is shown in different positions on the motion control device. While the driver's left hand is not shown in these drawings, the left hand may be positioned in the same manner on the motion control device 10, and may interact with the left grip 34 and the left paddle 82 in the same ways as described with reference to the right hand 30. There is no need for the right and left hands 30 to be in the same position on the motion control device 10 at the same time, and both hands may be positioned at any position as desired by the driver.

Figures 7, 8:
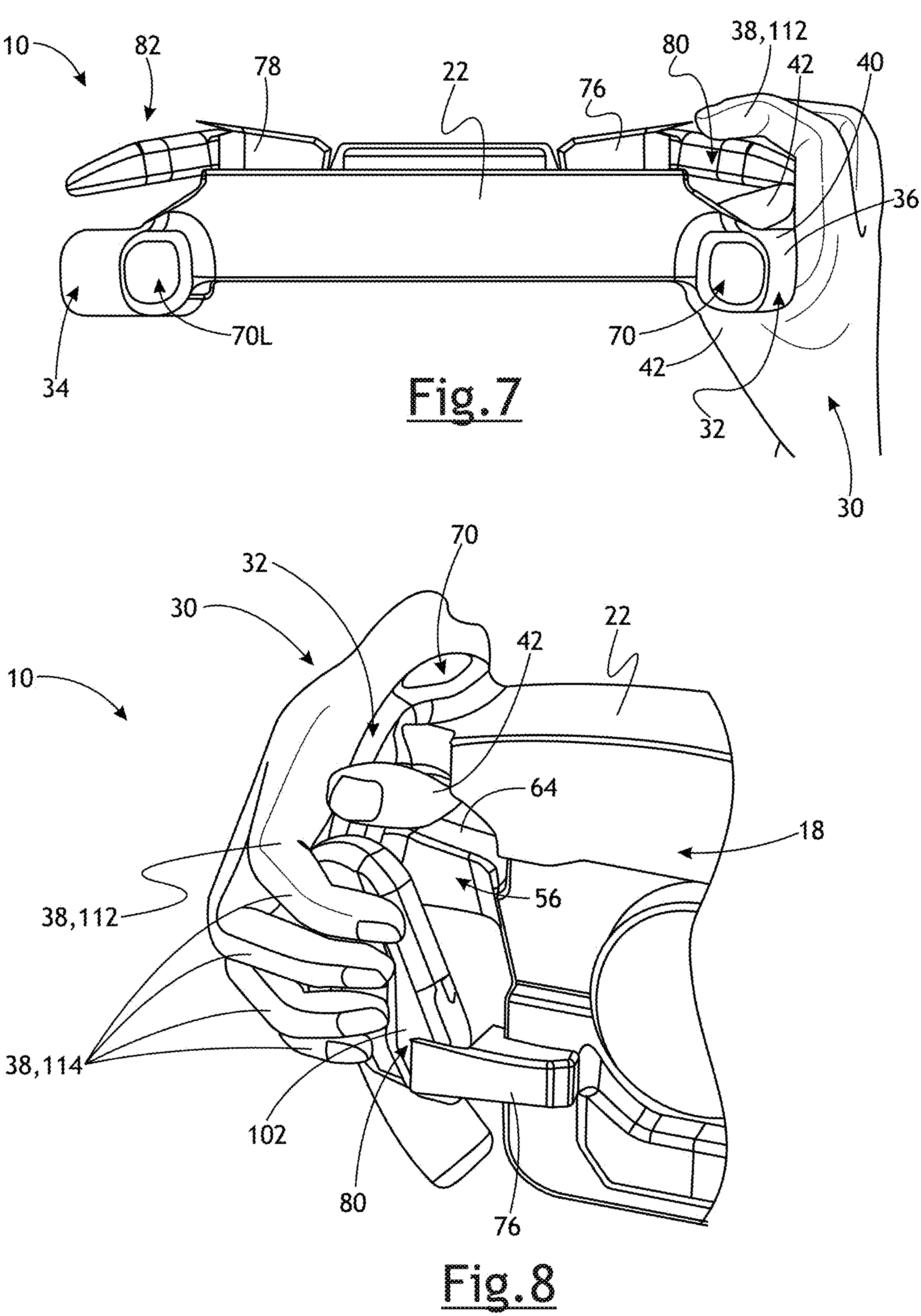
FIG. 7 shows another top view of the motion control device with a hand of a vehicle occupant.
FIG. 8 shows a perspective view of half of the motion control device with a hand of the vehicle occupant.

Specifically referring to FIGS. 7 and 8, the right hand 30 of the driver is shown positioned on the motion control device 10 so that the palm rests on the outer surface 36 of the right grip 32. The thumb 42 may be passed through the first right gap 58 so that the thumb 42 contacts of the rear surface 40 of the grip 32, with part of the grip 32 being grasped or enclosed by the thumb 42, part of the palm and part of the index finger 112 of the driver's hand 30. The driver's hand 30 may also contact the lower surface 62 of the first bridge 50 and/or the upper surface 64 of the second bridge 56, such as during rotation of the motion control 10 input about the axis 12 to steer the vehicle. One or more of the four remaining fingers 114 of each hand 30 may contact the right or left paddles 80, 82 on the inner grip surface 102, back side 84, outer grip surface 104 or any combination thereof to enable actuation of the paddle 80, 82.

Figure 5:
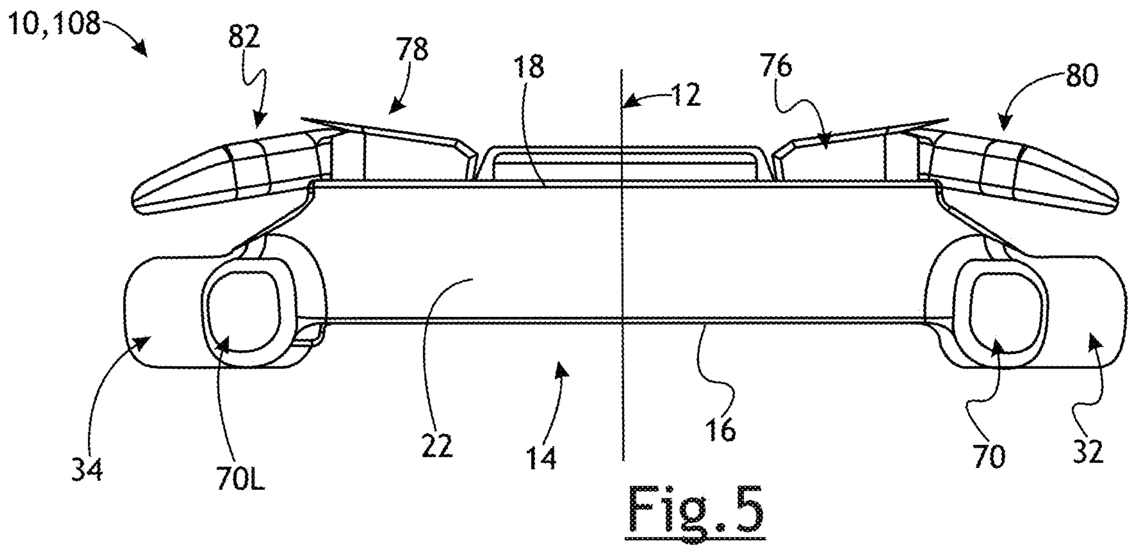
FIG. 5 shows a top view of the motion control device with a right paddle and a left paddle in a first position.
Figure 6:
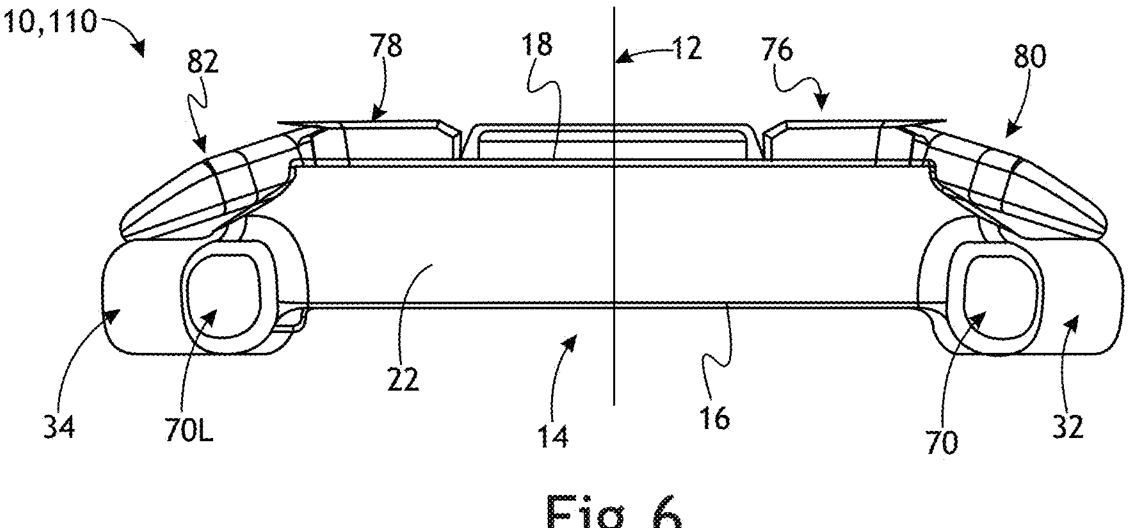
FIG. 6 shows another top view of the motion control device with the right paddle and the left paddle in a second position.
Figures 9, 10:
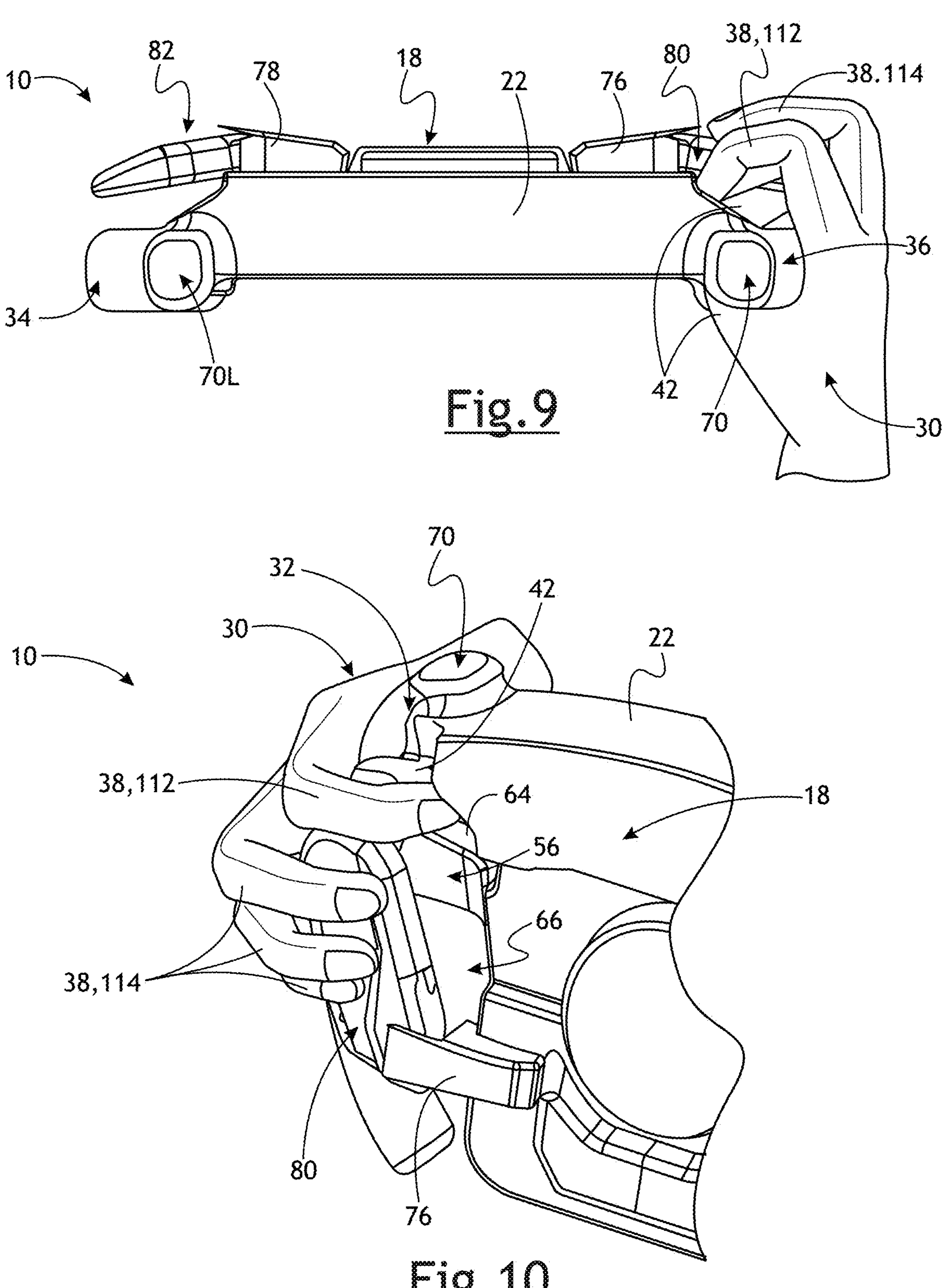
FIG. 9 shows another top view of the motion control device with a hand of the vehicle occupant.
FIG. 10 shows a perspective view of half of the motion control device with a hand of the vehicle occupant.

Specifically referring to FIGS. 9 and 10, the driver's hand 30 may be positioned generally as shown in FIGS. 5 and 6, and the index finger 112 may be received at least partially in the first gap 58. In this position, the index finger 112 is wrapped around the back of the thumb 42. This may improve the connection of the hand 30 to the grip 32, an provide an alternate hand position that still enables full control of the motion control device 10 while alleviating fatigue that can result if a hand 30 is left in the same position for extended periods of time.

Figure 11:
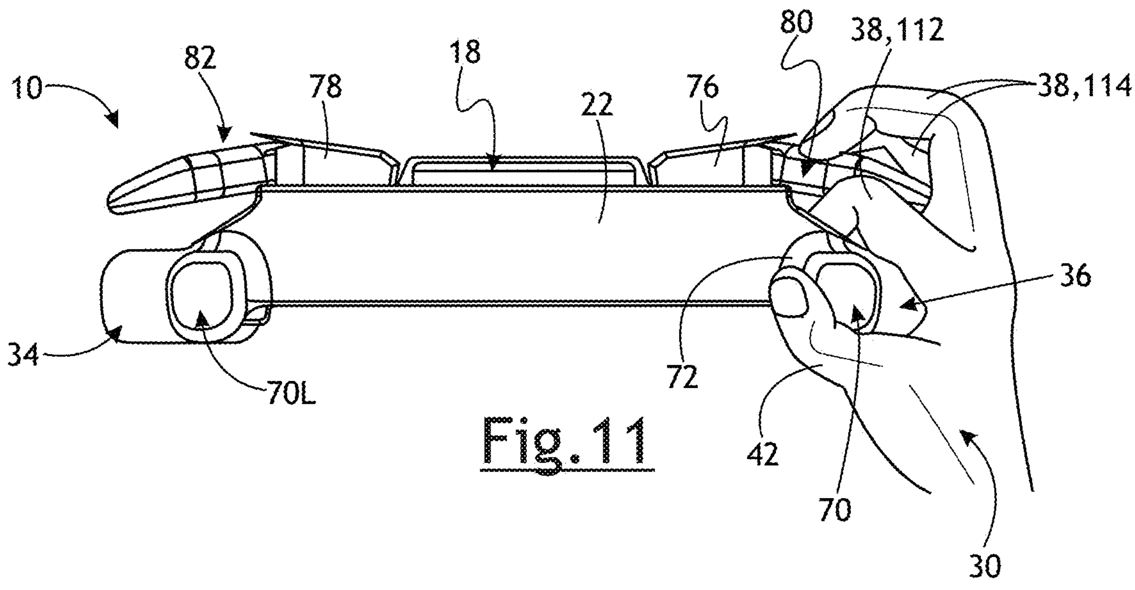
FIG. 11 shows another top view of the motion control device with a hand of the vehicle occupant.
Figure 12:
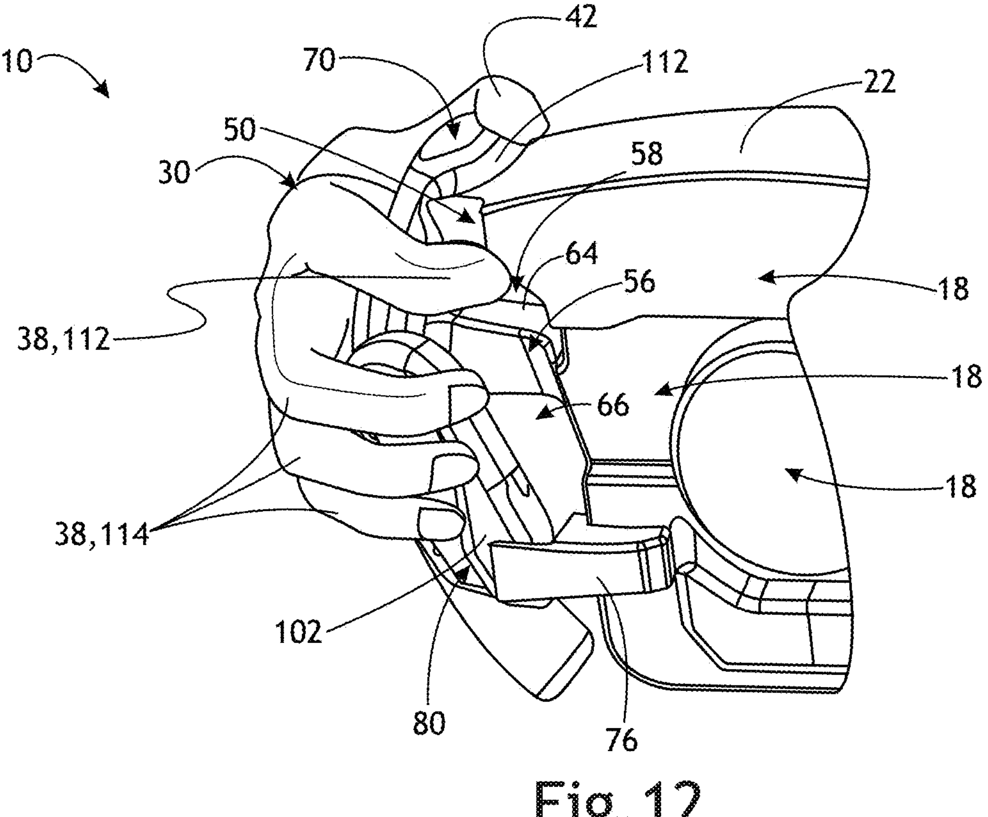
FIG. 12 shows a perspective view of half of the motion control device with a hand of the vehicle occupant.
Figure 13:
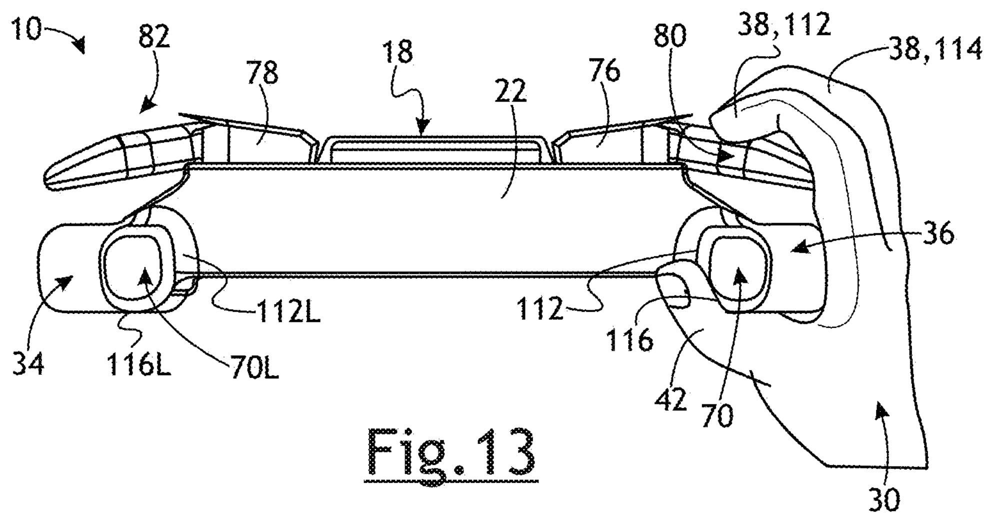
FIG. 13 shows another top view of the motion control device with a hand of the vehicle occupant.
Figure 14:
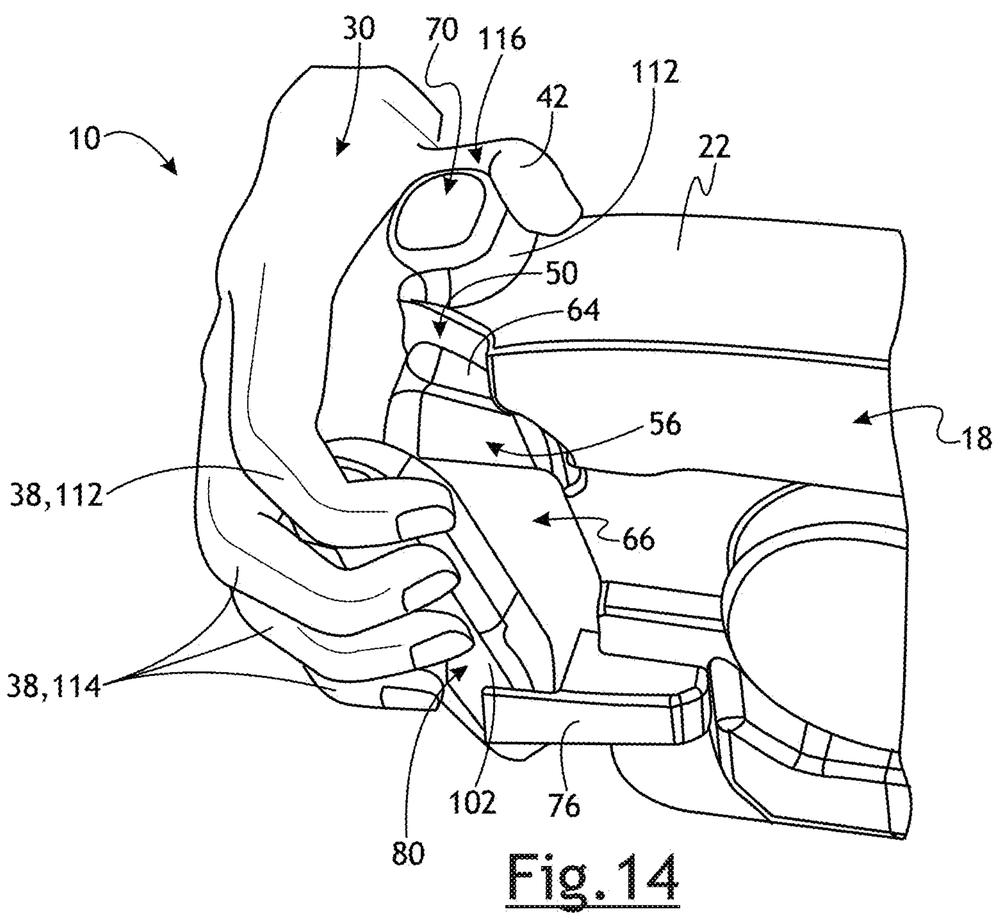
FIG. 14 shows a perspective view of half of the motion control device with a hand of the vehicle occupant.

As shown in FIGS. 11 and 12, the driver's hand 30 may also be positioned on the motion control device 10 so that the palm rests on the outer surface 36 of the grip 32, and the thumb 42 is positioned against part of the knob 70 at the top of the grip 32. The thumb 42 may engage or rest on the side 72, the upper surface 74, or parts of both, as desired. The side surfaces 72 provide a control or reaction surface against which the driver can, via the thumb 42, provide a force on to the motion control device 10. The index finger 112 may be looped through the first gap 58 from the back of the grip 32 and may be wrapped around the grip 32 and may engage the first and/or second bridge 50, 56. The index finger 112 could instead, as shown in FIGS. 13 and 14 and along with one or more of the three remaining fingers 114, contact the paddle 80 on the inner grip surface 102, back side 84, outer grip surface 104 or any combination there to be in position to actuate the paddle 80. In FIGS. 13 and 14, the thumb 42 is shifted lower on and wrapped around a front part 116 of the knob 70.

Figure 15:
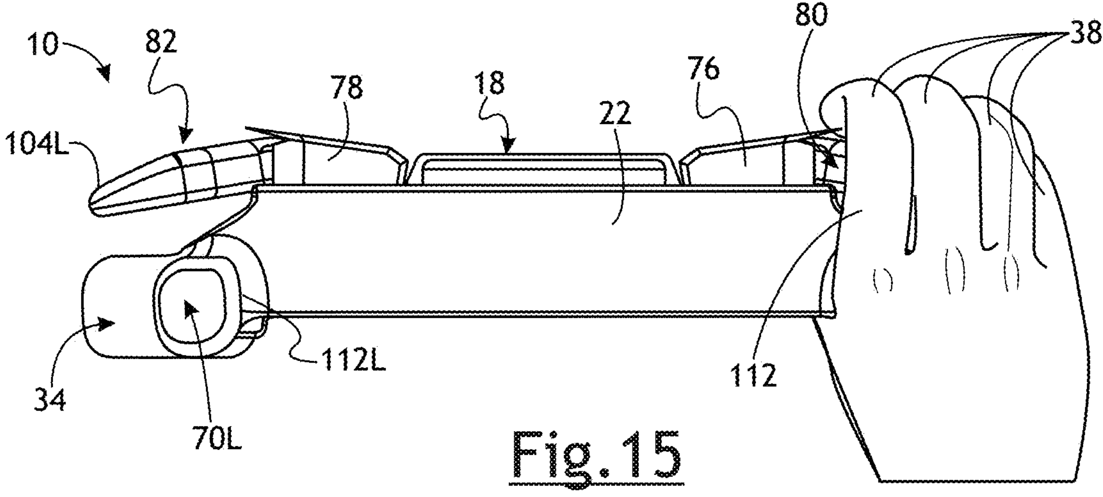
FIG. 15 shows another top view of the motion control device with a hand of the vehicle occupant.
Figure 16:
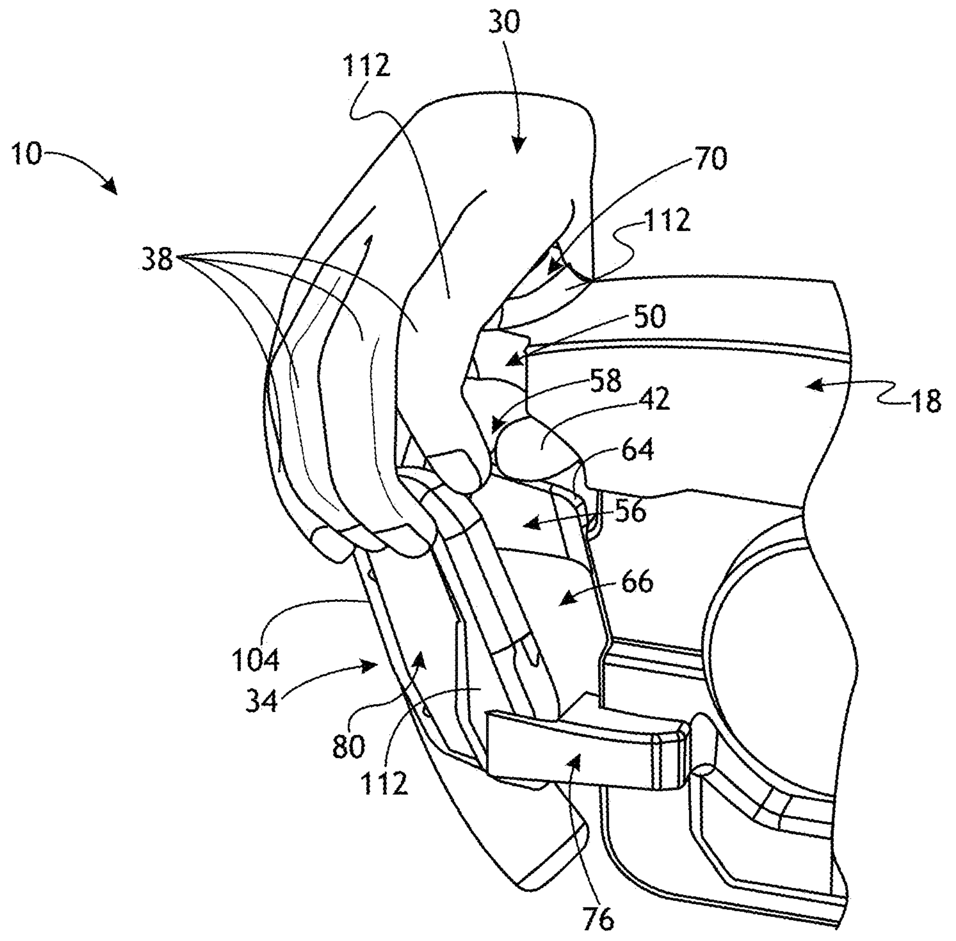
FIG. 16 shows a perspective view of half of the motion control device with a hand of the vehicle occupant.
Figure 17:
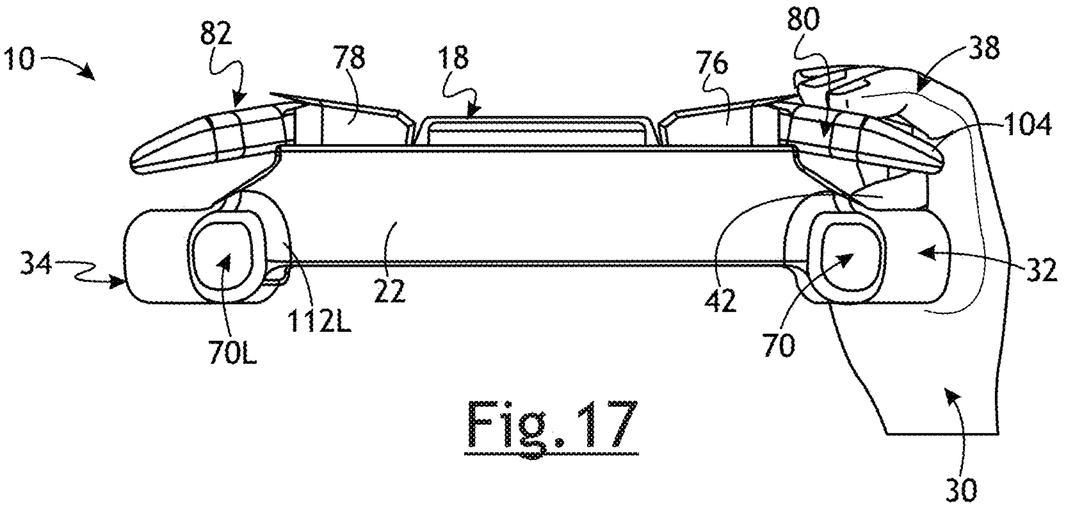
FIG. 17 shows another top view of the motion control device with a hand of the vehicle occupant.
Figure 18:
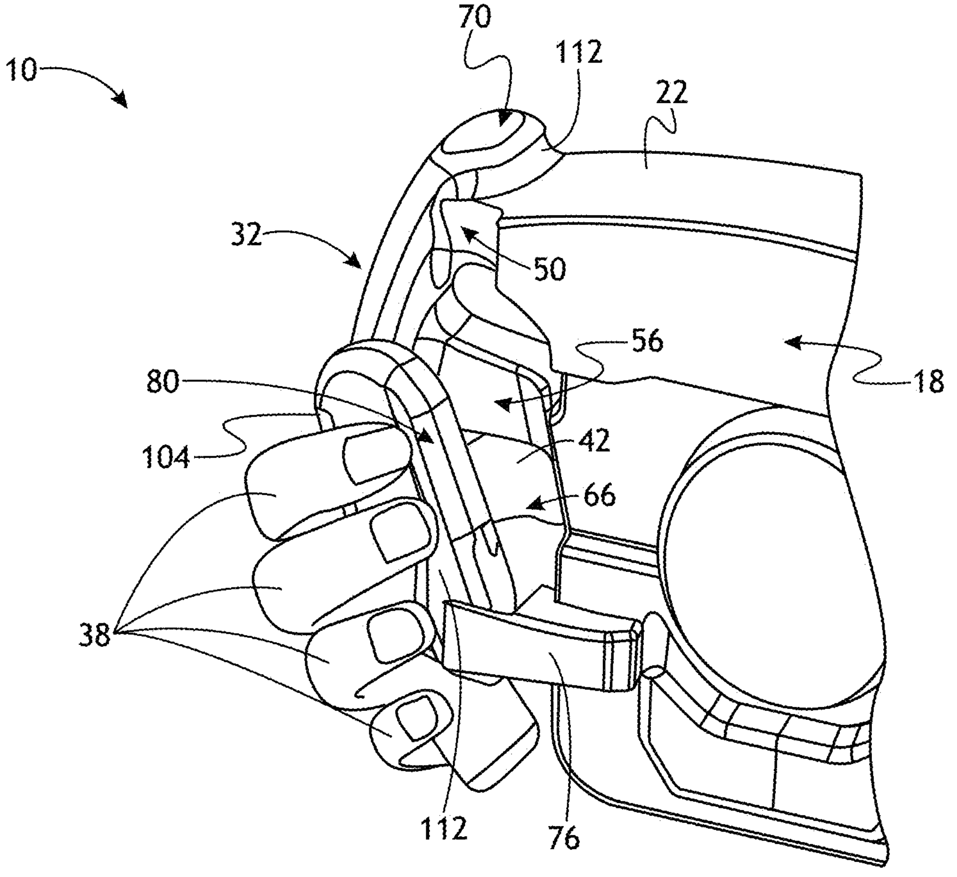
FIG. 18 shows a perspective view of half of the motion control device with a hand of the vehicle occupant.
Figure 19:
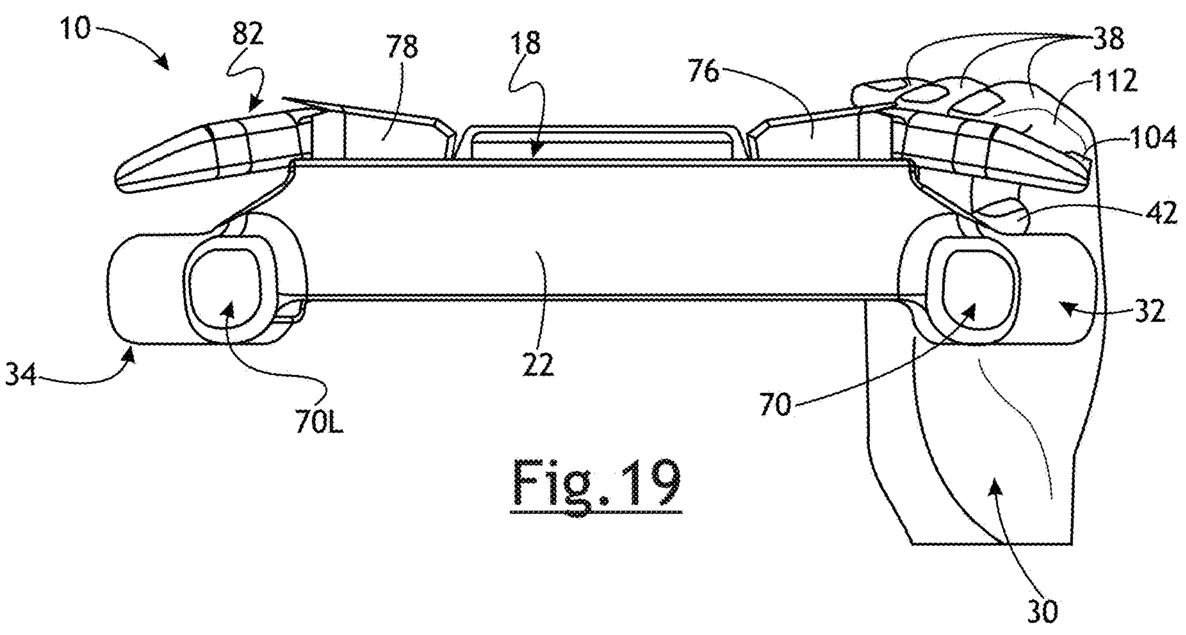
FIG. 19 shows another top view of the motion control device with a hand of the vehicle occupant.
Figure 20:
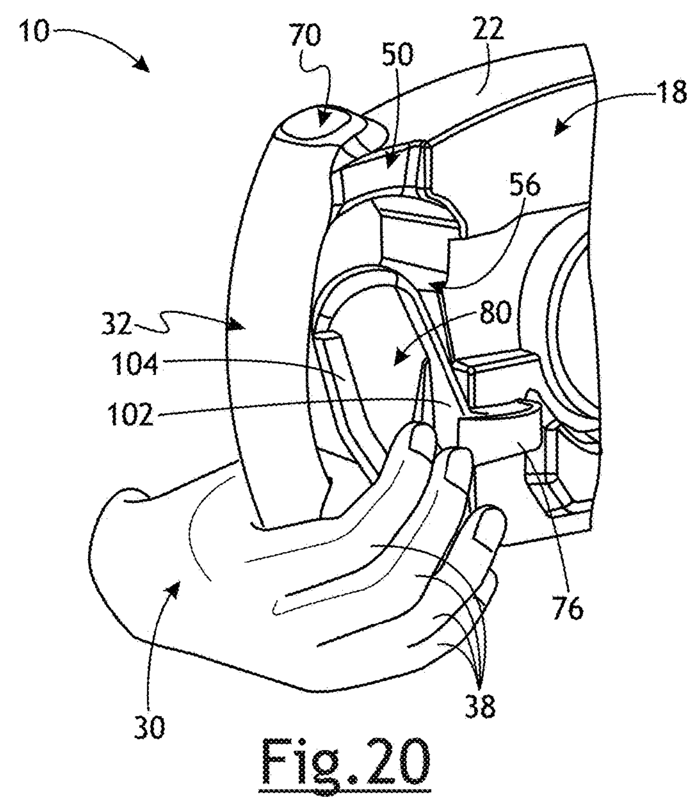
FIG. 20 shows a perspective view of half of the motion control device with a hand of the vehicle occupant.

In FIGS. 15 and 16, the driver's hand 30 is shown positioned on the motion control device 10 so that part of the palm and/or part of the index finger 112 rests on the upper surface 74 of the knob 70 and may also be on or near the outer surface 36 of the grip 32 with the fingers 38 behind or at the back side of the motion control device 10. The thumb 42 is looped into the first gap 58 from the front, and/or the index finger 112 may optionally be looped into the first gap 58 from the back side. One or more of the remaining fingers 114 may contact the paddle 80 in any desired manner/location to actuate the paddle 80.

As shown in FIGS. 17-20, the driver's hand 30 can also be positioned on the motion control device 10 so that the palm rests on the outer surface 36 of the right and left grips 32, 34, below the vertical position of the second bridge 56. The thumb 42 may be looped around the grip 32 in the second gap 66, below the second bridge 56. One or more of the remaining fingers 114 may contact the paddle 80 in any desired manner or location to actuate the paddle 80, and one or more fingers 38 may also be wrapped around part of the grip 32, as desired. For example, the pinky finger 118 can be positioned on the grip 32, near the lower end of the grip 32.

The motion control device 10 can thus receive a driver's hand 30 in a number of comfortable positions, each of which permits a driver to rotate the motion control device 10 to steer the vehicle, and to actuate the paddles 80, 82 to control the vehicle speed. The various positions provide reaction and/or gripping surfaces so the driver's hands 30 can remain on and provide force to the motion control device 10 and the various positions help to reduce fatigue that would otherwise be experienced without a number of comfortable hand positions being enabled by the design of the motion control device 10.

In at least some implementations, the back side 84 of the paddles 80, 82 are within 14.5 mm of the rear surface 40 of the grip 32 in the longitudinal direction, and the outer side 88 of the paddles 80, 82 are within 3 mm to 30 mm of the outer surface 36 of the grips 32, 34, in the lateral direction. That is, the outer side 88 of the paddles 80, 82 may be at a radius from the axis of rotation that has a length that is between a radius to the outer surface of the grips and the inner surface of the grips. The paddle position ensures that the paddles 80, 82 can be comfortably reached and overlapped by the driver's fingers 38 when the drivers palm is engaged with the grip 32, 34.

Further, in at least some implementations, the upper edges 98 of the paddles 80, 82 are within 46 mm of the upper surface 74 of the knob 70, and within 10 mm of the upper surface 64 of the second bridge 56. In this way, it is ensured that the reaction surfaces 72, 74 of the knob 70 and in the first gap 58 are provided near enough to the paddles 80, 82 to permit a driver's hand 30 to engage these surfaces and the paddle 80, 82. Further, the upper surface 74 of the knob 70 has a surface area of between 550 $mm^2$ and 650 $mm^2$, and the knob 70 is raised from at least one adjacent surface (e.g. the upper surface 54 of the first bridge 50 and/or the top surface 22 of the main body 14) by between 0 mm and 40 mm. This enables a driver's palm to be received comfortably over the knob 70, and to surround and apply a force to at least part of the knob 70 to facilitate use of the motion control device 10. The height of the knob 70 ensures that the side surface 72 can be engaged by part of the user's hand 30, for example, the palm and/or thumb 42, as noted above. Further, a side of the knob 70 farthest from the outer surface 36 of the grip 32 may be within 60 mm of the outer surface 36 of the grip 32 at the upper end 46 of the grip 32, to enable the thumb 42 to be at least partially wrapped around that side of the knob 70 while the palm is engaged with the outer surface 36 of the grip 32 (e.g. as shown in FIGS. 11 and 12). The first bridge 50 may have a vertical dimension of less than 30 mm, a longitudinal thickness of less than 35 mm and a lateral width of less than 30 mm. The second bridge 56 may similarly have a vertical dimension of less than 50 mm, a longitudinal thickness of less than 22 mm and a lateral width of less than 20 mm. The grip 32 may have a perimeter length of between 175 mm and 250 mm and may be rounded to improve the comfort to a driver when the driver's hand 30 is at least partially wrapped around the grip 32. The first gap 58 may have a surface area at a front side thereof of between 1350 $mm^2$ and 1500 $mm^2$ to receive one more digits 38 of the driver's hand 30 (e.g. thumb 42 and/or index finger 112).

What is claimed is:

1. A motion control device for controlling a vehicle, comprising:

a main body, a right grip connected to the main body by a first right bridge and a second right bridge, a left grip connected to the main body by a first left bridge and a second left bridge, the right grip and the left grip are each spaced from the main body, and the right grip and the left grip are configured to be grasped by a hand and/or one or more fingers of a vehicle occupant, wherein the second right bridge is connected to the right grip between an upper end of the right grip and a lower end of the right grip and at or closer to a midpoint of the right grip than the lower end of the right grip, where the midpoint of the right grip is midway between the upper end and the lower end, and the right grip is not connected to the main body between the lower end and the second right bridge, and wherein the second left bridge is connected to the left grip between an upper end of the left grip and a lower end of the left grip and at or closer to a midpoint of the left grip than the lower end of the left grip, where the midpoint of the left grip is midway between the upper end of the left grip and the lower end of the left grip, and the left grip is not connected to the main body between the lower end of the left grip and the second left bridge;

a right paddle pivotably mounted to the main body and located behind the right grip, and a left paddle pivotably mounted to the main body and located behind the left grip, the right paddle and the left paddle being movable relative to the main body between a first position and a second position, wherein an upper edge of the right paddle is vertically below a lower surface of the first right bridge and vertically above an upper surface of the second right bridge, and wherein an upper edge of the left paddle is vertically below a lower surface of the first left bridge and vertically above an upper surface of the second left bridge;

a first right gap defined between the main body, the right grip, the first right bridge and the second right bridge, wherein the first right gap, the right grip, and the right paddle are configured to simultaneously receive one or more fingers, or surfaces of a hand of the vehicle occupant;

a first left gap defined between the main body, the left grip, the first left bridge, and the second left bridge, wherein the first left gap, the left grip, and the left paddle are configured to simultaneously receive one or more fingers, or surfaces of a hand of the vehicle occupant;

a second right gap defined between the main body, the right grip, and the second right bridge, wherein the second right gap, the right grip, and the right paddle are configured to simultaneously receive one or more fingers or surfaces of a hand of the vehicle occupant; and a second left gap partially defined between the main body, the left grip, and the second left bridge, wherein the second left gap, the left grip, and the left paddle are configured to simultaneously receive one or more fingers or surfaces of a hand of the vehicle occupant.

2. The motion control device of claim 1, wherein the right grip extends beyond a top surface of the main body and has a right knob with an upper surface and one or more peripheral side surfaces;

the upper surface, the one or more peripheral side surfaces, the right grip, and the right paddle are configured to simultaneously contact one or more fingers or surfaces of a hand of the vehicle occupant, and wherein the upper edge of the right paddle is within 46 mm of the upper surface of the right knob, and wherein the left grip extends beyond the top surface of the main body and has a left knob, the left knob has an upper surface and one or more peripheral side surfaces, and wherein the upper edge of the left paddle is within 46 mm of the upper surface of the left knob.

3. The motion control device of claim 2, wherein the right knob and the left knob each has a surface area between 550 $mm^2$ and 650 $mm^2$ and each of the right knob and the left knob is raised from the top surface of the main body by up to 40 mm.

4. The motion control device of claim 1, wherein the upper edge of the right paddle is vertically closer to the second right bridge than to the first right bride, and the upper edge of the left paddle is vertically closer to the second left bridge than to the first left bridge.

5. The motion control device of claim 1 wherein, the right paddle has a front side and a back side wherein, the back side has a right inner grip surface at a different angle or elevation relative to a back surface of the main body, wherein the main body is positioned in use so that the back surface faces away from the vehicle occupant.

6. The motion control device of claim 1 wherein, the left paddle has a front side and a back side wherein, the back side has a left inner grip surface at a different angle or elevation relative to a back surface of the main body, wherein the main body is positioned in use so that the back surface faces away from the vehicle occupant.

7. The motion control device of claim 1 wherein, the left paddle is coupled to the main body by a left mount at a location closer to a lower edge of the left paddle than the upper edge of the left paddle, and the right paddle is connected to the main body by a right mount at a location closer to a lower edge of the right paddle than the upper edge of the right paddle, and the left paddle extends from the left mount towards the left grip, and the right paddle extends from the right mount towards the right grip.

8. The motion control device of claim 1 wherein, the right paddle and the left paddle are mechanically biased towards the first position, and the right paddle is farther from the right grip in the first position than in the second position and the left paddle is farther from the left grip in the first position than in the second position.

9. The motion control device of claim 1 wherein, the left paddle includes a left outer grip surface that is elevated from a back side of the left paddle that faces away from the left grip, and the right paddle includes a right outer grip surface that is elevated from a back side of the right paddle that faces away from the right grip.

10. The motion control device of claim 1 wherein the main body has a top surface and a bottom surface spaced apart in a vertical direction, a left side and a right side spaced apart in a lateral direction, and a front surface and a back surface spaced apart in a longitudinal direction, and wherein the right grip is spaced from the right paddle in the longitudinal direction, and the right grip vertically and laterally overlaps the right paddle.

11. A vehicle, comprising:

a propulsion system having a prime mover that provides power to propel the vehicle;

a braking system having one or more brake assemblies configured to slow and stop the vehicle;

a steering system configured to control a steering angle of the vehicle; and a motion control device, including:

a main body that has a front surface, a back surface, a top surface, a bottom surface, a right side, and a left side, the main body is rotatable about an axis to actuate the steering system and change the steering angle;

a right paddle mounted to the back surface by a right mount, wherein the right paddle is actuatable between a first position and a second position to cause an output used to control one of the braking system or the propulsion system;

a right paddle sensor capable of determining the instantaneous position of the right paddle between the first position and the second position;

a right grip extended from the right side, wherein the right grip is received in front of the right paddle;

a right knob extending from the right grip and vertically elevated from the top surface of the main body;

a left paddle mounted to the back surface by a left mount, wherein the left paddle is actuatable between a first position and a second position to cause an output used to control the other one of the braking system or the propulsion system that is not associated with the right paddle;

a left paddle sensor capable of determining the instantaneous position of the left paddle between the first position and the second position;

a left grip extended from the left side, wherein the left grip is received in front of the left paddle;

a left knob extending from the left grip and vertically elevated from the top surface of the main body;

a first right gap circumferentially surrounded by the main body, the right grip, and a first right bridge that connects the main body and the right grip;

a second right gap partially circumferentially surrounded by the main body, the right grip, and a second right bridge;

a first left gap circumferentially surrounded by the main body, the left grip, and a first left bridge that connects the main body and the left grip; and a second left gap partially circumferentially surrounded by the main body, the left grip, and a second left bridge, wherein the top surface and the bottom surface are spaced apart in a vertical direction, the left side and the right side are spaced apart in a lateral direction, and the front surface and the back surface are spaced apart in a longitudinal direction, the right knob has a peripheral side surface that extends vertically to an upper surface, the upper surface is above the top surface of the main body, and the right knob has a front surface that is offset from and forward of the front surface of the main body, and wherein an upper edge of the right paddle is vertically below a lower surface of the first right bridge and vertically above an upper surface of the second right bridge, and wherein an upper edge of the left paddle is vertically below a lower surface of the first left bridge and vertically above an upper surface of the second left bridge.

12. The vehicle of claim 11 wherein, the right grip and the left grip each have a front surface that is offset and forward of the front surface of the main body.

13. The vehicle of claim 11 which also includes one or more electric actuators positioned on or within the main body or the right mount or the left mount and arranged to provide a force on either or both of the right paddle and left paddle.

14. The vehicle of claim 11 wherein, the main body has a range of rotation about the axis, the range of rotation is adjustable based on one or more vehicle conditions including instantaneous speed of the vehicle, historical speed of the vehicle, instantaneous vehicle turning radius, historical vehicle turning radius, instantaneous rate of rotation of the main body, and historical rate of rotation of the main body.

15. The vehicle of claim 11 which also includes a control system coupled to the propulsion system, the brake system, the steering system and the motion control device, the control system includes one or more processors, memory and instruction by which the control system controls operation of the propulsion system as a function of movement of one of the right paddle or the left paddle, and controls operation of the braking system as a function of movement of the other one of the right paddle or the left paddle, and controls the steering system as a function of the rotation of the main body.

16. The vehicle of claim 15 wherein the steering system is a steer by wire system in which rotation of the main body results in the control system actuating one or more steering actuators to change the steering angle, and wherein rotation of less than 180 degrees about the axis causes the steering system to provide a maximum steering angle of the vehicle.

17. The vehicle of claim 11 wherein the top surface and the bottom surface are spaced apart in the vertical direction, the left side and the right side are spaced apart in the lateral direction, and the front surface and the back surface are spaced apart in the longitudinal direction, and wherein the right grip is spaced from the right paddle in the longitudinal direction, and the right grip vertically and laterally overlaps the right paddle.

18. The vehicle of claim 11 wherein the second right bridge is connected to the right grip between an upper end and a lower end of the right grip and at or closer to a midpoint of the right grip than the lower end of the right grip, where the midpoint of the right grip is midway between the upper end and the lower end, and the not connected to the main body between the lower end and the second right bridge.

19. The vehicle of claim 11 wherein the first right gap and the right paddle are arranged so that at least one finger of user's hand can be received in the first right gap spaced from the right paddle, and a different finger than said at least one finger can engage and actuate the right paddle.

20. The vehicle of claim 11 wherein the right knob and the right paddle are arranged so that the right paddle can be actuated by a finger of a user while a palm of a hand of the user that includes the finger is received on a top surface of the knob, or wherein the right knob and the right paddle are arranged so that the right paddle can be actuated by a finger of a user while a thumb of a hand of the user that includes the finger is in contact with a peripheral side surface of the knob.

* * * * *